US012054059B2

(12) United States Patent
Zethraeus et al.

(10) Patent No.: US 12,054,059 B2
(45) Date of Patent: Aug. 6, 2024

(54) METHOD FOR ACTIVATING A POWERING SEGMENT IN AN ELECTRIC ROAD SYSTEM AND AN ELECTRIC ROAD SYSTEM

(71) Applicant: ELONROAD AB, Lund (SE)

(72) Inventors: Dan Zethraeus, Lund (SE); Andreas Sörensen, Lund (SE)

(73) Assignee: ELONROAD AB, Lund (SE)

( * ) Notice: Subject to any disclaimer, the term of this patent is extended or adjusted under 35 U.S.C. 154(b) by 716 days.

(21) Appl. No.: 17/318,361

(22) Filed: May 12, 2021

(65) Prior Publication Data
US 2021/0331593 A1    Oct. 28, 2021

Related U.S. Application Data

(63) Continuation of application No. 16/088,085, filed as application No. PCT/EP2017/057273 on Mar. 28, 2017, now Pat. No. 11,034,250.

(30) Foreign Application Priority Data

Mar. 29, 2016    (SE) .................................... 1650404-5

(51) Int. Cl.
*B60L 53/126*    (2019.01)
*B60L 53/39*    (2019.01)
(Continued)

(52) U.S. Cl.
CPC ............. *B60L 53/126* (2019.02); *B60L 53/39* (2019.02); *B60L 53/65* (2019.02); *B60L 53/665* (2019.02);
(Continued)

(58) Field of Classification Search
CPC ........ B60L 53/39; B60L 53/65; B60L 53/126; B60L 53/12; B60M 1/02; B60M 1/30;
(Continued)

(56) References Cited

U.S. PATENT DOCUMENTS

| 5,207,304 A | 5/1993 | Lechner et al. |
| 5,277,285 A * | 1/1994 | Musachio ................ B60M 1/36 180/2.1 |

(Continued)

FOREIGN PATENT DOCUMENTS

| EP | 2541730 A1 | 1/2013 |
| WO | 2011046405 A2 | 4/2011 |
| WO | 2016014181 A1 | 1/2016 |

OTHER PUBLICATIONS

International Search Report and Written Opinion of PCT/EP2017/057273 mailed Jun. 21, 2017, 12 pages.

*Primary Examiner* — Zachary L Kuhfuss
(74) *Attorney, Agent, or Firm* — Shih IP Law Group, PLLC

(57) ABSTRACT

The present invention relates to a method for activating a segment for enabling electrical power delivery to vehicles, the segment being one of a plurality of segments consecutively arranged along a single track line of an electric road system that further comprises a base station, the method comprising: receiving, at the base station, identification data transmitted from a vehicle, the identification data identifying the vehicle; associating an activation key with the identification data with each other; transmitting the activation key from the base station to the segment; receiving, at the segment and via short range radio communication, an activation request sent from the vehicle, wherein the activation request comprises an identification key associated with the identification data; confirming, at the segment, that the received identification key is associated with the received activation key; and upon positive confirmation, activating the segment for enabling power delivery to the vehicle.

9 Claims, 6 Drawing Sheets

(51) Int. Cl.
    *B60L 53/65*    (2019.01)
    *B60L 53/66*    (2019.01)
    *B60M 1/02*    (2006.01)
    *B60M 1/30*    (2006.01)
    *B60M 7/00*    (2006.01)

(52) U.S. Cl.
    CPC ................ *B60M 1/02* (2013.01); *B60M 1/30* (2013.01); *B60M 7/003* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
    CPC .... B60M 7/003; Y02T 10/70; Y02T 10/7072; Y02T 90/12; Y02T 90/14; Y02T 90/16; Y02T 90/167; Y04S 30/14
    USPC ..................................................... 191/14–21
    See application file for complete search history.

(56) References Cited

U.S. PATENT DOCUMENTS

| | | | |
|---|---|---|---|
| 6,189,664 B1* | 2/2001 | Siciliano | B60M 1/103 |
| | | | 191/6 |
| 6,382,378 B1* | 5/2002 | Cornic | B60M 1/10 |
| | | | 191/20 |
| 8,365,888 B2* | 2/2013 | Re Fiorentin | B60M 1/36 |
| | | | 191/23 R |
| 11,034,250 B2* | 6/2021 | Zethraeus | B60M 7/003 |
| 2012/0067684 A1 | 3/2012 | Asplund | |
| 2014/0125286 A1 | 5/2014 | Cho et al. | |
| 2019/0111799 A1 | 4/2019 | Zethraeus | |

\* cited by examiner

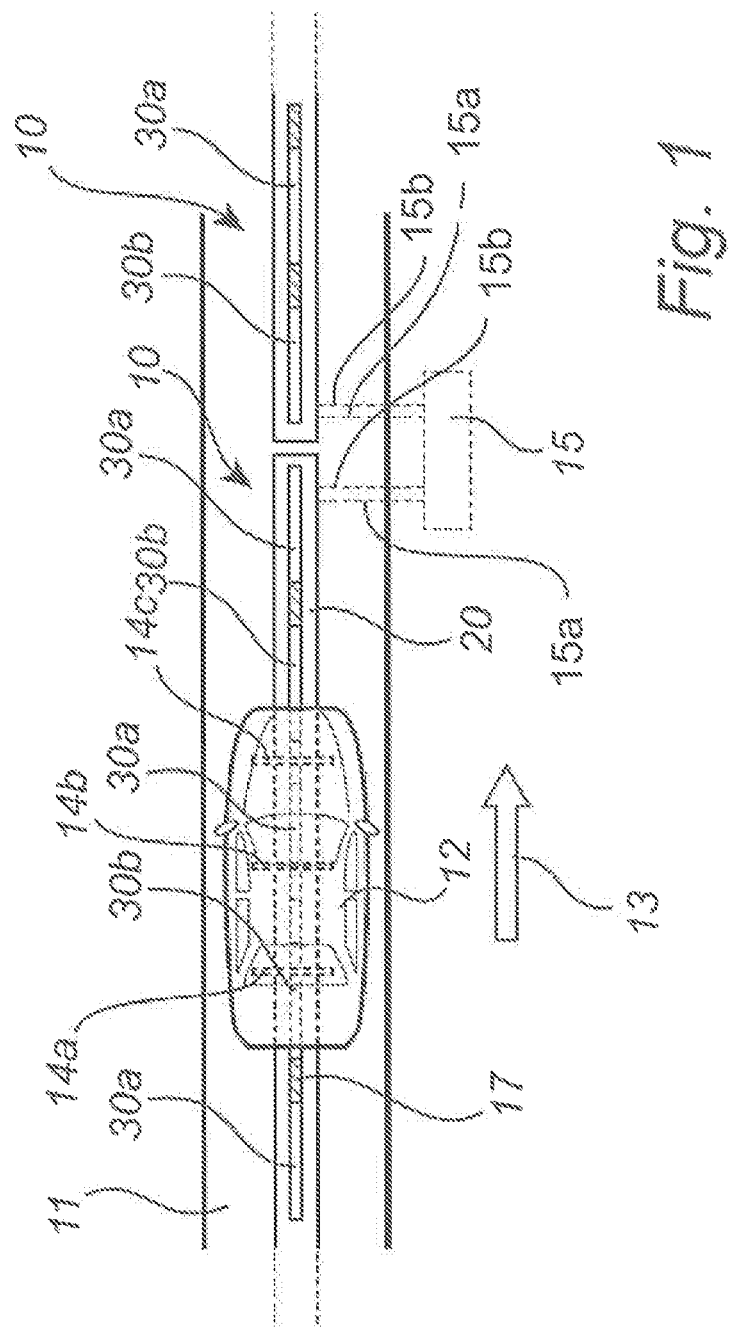

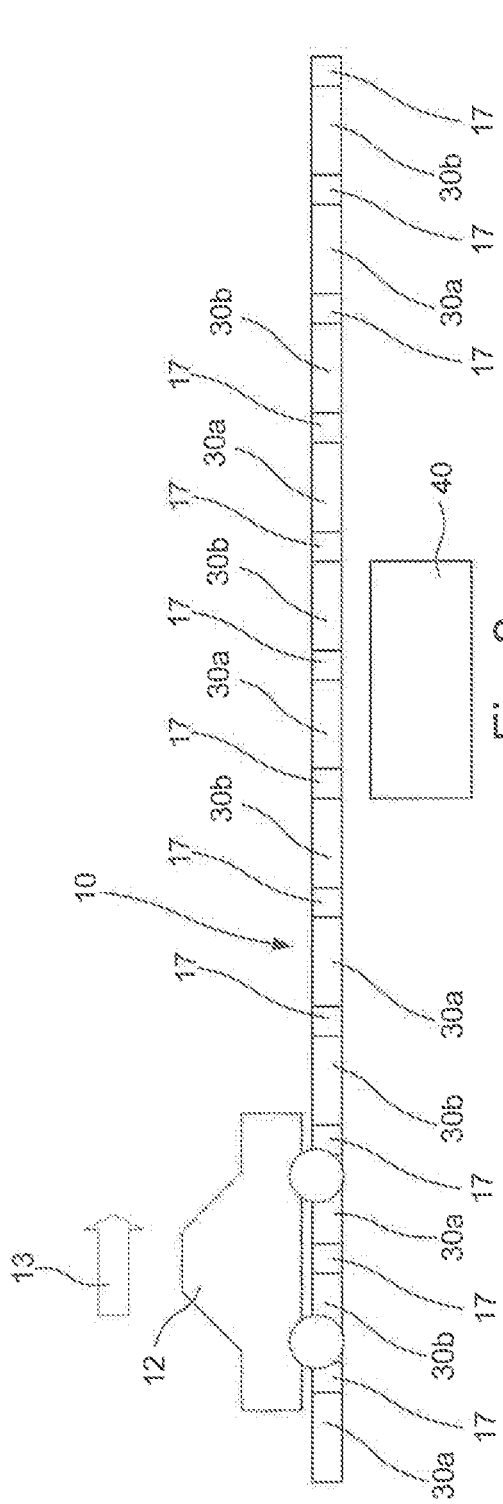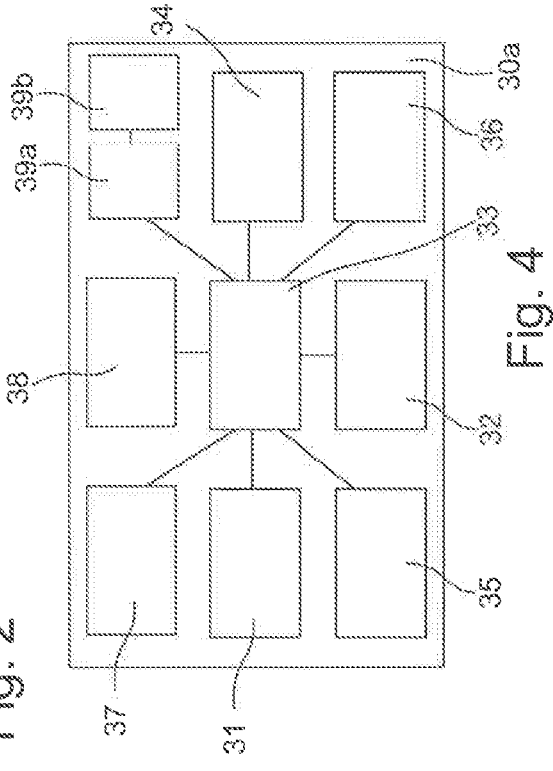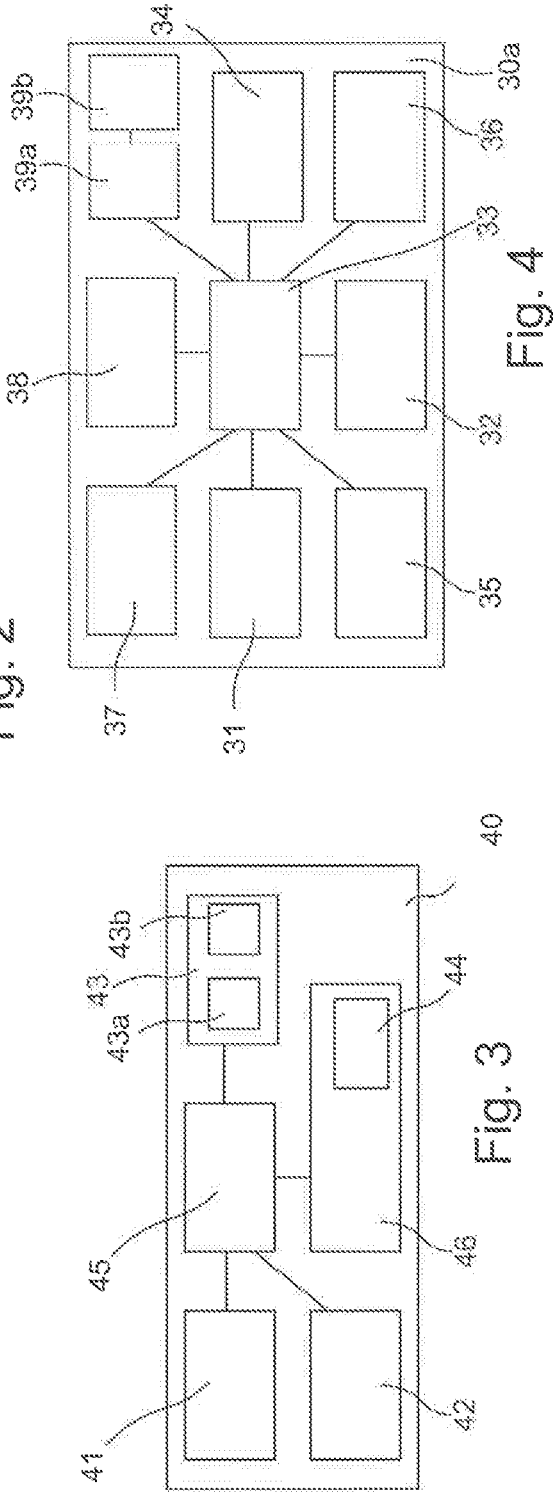

METHOD FOR ACTIVATING A POWERING SEGMENT IN AN ELECTRIC ROAD SYSTEM AND AN ELECTRIC ROAD SYSTEM

CROSS-REFERENCE TO RELATED APPLICATION

This Application is a Continuation of U.S. Ser. No. 16/088,085, filed Sep. 25, 2018; which is a National Stage filing under 35 U.S.C. § 371 of PCT Application Ser. No. PCT/EP2017/057273 filed on Mar. 28, 2017; which claims the benefit of Sweden Patent Application No. 1650404-5 filed on Mar. 29, 2016. The disclosures of which are incorporated herein by reference in their entireties.

TECHNICAL FIELD

The present invention relates to an electric road system. Especially the present invention relates to a method for activating a powering segment in the electric road system. Moreover, a method for electrically powering a vehicle by the electric road system and a vehicle configured to be powered by the electric road system are disclosed.

BACKGROUND

Electric vehicles, such as electric cars, are increasingly popular. The motor of the vehicle is typically powered by a battery when in use. Typically, the battery is charged when the vehicle is parked in for instance a parking lot or at home. A problem with this approach is that large and heavy batteries are needed in order to provide a long running time and the charging may be lengthy.

A solution to the above problem is to charge and/or power the electric vehicle while driving on a road. A common name for systems which provides such charging and/or powering is electric road systems.

A problem for electric road systems is to provide electrical safety, especially in urban areas. Electrically chocking people interacting with the electric road system shall be avoided.

Another problem for electrical road systems is the billing of users using the system. It must be safeguarded that it is the right user that is billed for his outtake of electricity from the system.

Thus, there is an evident need for improving known electric road systems.

SUMMARY OF THE INVENTION

It is an object of the present invention to at least partly address the challenges discussed above.

According to a first aspect a method for activating a segment for enabling electrical power delivery to vehicles is provided. The segment being one of a plurality of segments consecutively arranged along a single track line of an electric road system that further comprises a base station. The method comprises receiving, at the base station, identification data transmitted from a vehicle, the identification data identifying the vehicle; associating an activation key with the identification data; transmitting the activation key from the base station to the segment; receiving, at the segment and via short range radio communication, an activation request sent from the vehicle, wherein the activation request comprises an identification key associated with the identification data; confirming, at the segment, that the received identification key is associated with the received activation key; upon positive confirmation, activating the segment for enabling power delivery to the vehicle.

By providing the vehicle and the segments with the identification key and the activation key respective provide for quick activation of the segments upon the vehicle approaching. The segments are already prepared and warned that the vehicle will arrive soon. Moreover, the method provides for separating power outtake for different vehicles. This since each vehicle identifies itself in order to activate segments of the electric road system. Moreover, the segments of the electric road system may be individually activated and monitored. Providing for that segments that are not in use may be switched off. The method also provides for individual measurement of power out take from the electric road system, hence, each vehicle's power consumption may be monitored providing an individual payment solution.

The method may further comprise, upon positive confirmation, transmitting a deactivation request from the segment to a previously activated segment of the plurality of segments. The previously activated segment may be a nearby segment. The term "nearby" shall in this context be construed as a segment being located at maximum four segments away from the present segment. This provide for a deactivation of previously powered segments. Hence, an increased safety of the electric road system is achieved.

The method may further comprise determining a speed of the vehicle; determining an activation time period based on the determined speed of the vehicle and a length of the segment; wherein the segment is set to be active during a time period corresponding to the activation time period. This provide for a deactivation of powered segments in an alternative manner. Hence, an increased safety of the electric road system is achieved.

The method may further comprise storing the, with each other associated, identification key, activation key and identification data in a database.

The method may further comprise measuring power delivered by the powering segment while activated; and storing the measured delivered power in the database in association with the identification data. This provide for that the vehicle itself does not have to keep track of how much power it draws from the electric road system but the electric road system itself monitors and stores the consumption of each vehicle. This allow for the electric road system to keep track of payment schedule for the vehicles. Moreover, an electric road system that does not rely on the vehicle's log systems for consumed energy avoids the problem of "energy thieves". Moreover, in this manner the system may e.g. deny power outtake if for example a previous bill is not paid.

One or more of the acts of receiving identification data, transmitting the identification key, and transmitting the activation key is performed via a mid-range radio communication, wherein the mid-range radio communication is a radio communication having a range of at least 100 meters, preferably a range of at least 500 meters.

In this context the terms "active" shall be construed as that a segment of the first set of segments is in a state wherein it may deliver electric power to the vehicle. Hence, a segment of the first set of segments is active as long as the segment is set to have a potential being different from ground. Moreover, in this context the terms "activate or activating" shall be construed as to the action of setting a segment of the first set of segments to a potential different from ground. Furthermore, in this context the terms "deactivate or deactivating" shall be construed as to the action of setting an active segment into a non-active state. Hence, the active segment is controlled such that the potential is set to ground.

According to a second aspect an electric road system for enabling electrical powering of vehicles is provided. The electric road system comprises a plurality of segments consecutively arranged along a single track line, wherein every second of the plurality of segments belong to a first set of segments; and a base station. The base station comprises a receiver configured to receive an identification message, the identification message comprising identification data identifying a vehicle; an association module configured to associate the identification data with an activation key; and a transmitter module configured to transmit the activation key to the segments in the first set of segments. Each segment in the first set of segments comprises a receiver configured to receive the activation key; a memory configured to store the received activation key; a short range radio communication receiver configured to receive an activation request from the vehicle, the activation request comprising an identification key associated with the identification data; an authorization module configured to confirm that the received identification key is associated with the received activation key; and an activation module configured to, upon positive confirmation, activate the segment for enabling power delivery to the vehicle.

The above mentioned features of the method according to the first aspect, when applicable, apply to this second aspect as well. In order to avoid undue repetition, reference is made to the above.

Each segment in the first set of segments may further comprise a transceiver configured to, upon positive confirmation, transmit a deactivation request from the segment to a nearby segment in the first set of segments; and a deactivation module configured to, upon receipt of a deactivation message, deactivate the segment for disabling power delivery to the vehicle.

The electric road system may further comprise a database configured to store the associated identification key, activation key and identification data.

Each segment in the first set of segments may further comprise a measuring module configured to measure power delivered by the segment while the segment is active; and a transmitter configured to transmit the measured delivered power to the database for storing the measured delivered power therein in association with the identification data.

According to a third aspect a method for electrically powering a vehicle by an electric road system that comprises a plurality of segments consecutively arranged along a single track line and a base station is provided. The method comprises transmitting, from the vehicle to the base station, identification data identifying the vehicle; setting, at the vehicle, an identification associated with the identification data; transmitting, from the vehicle to at least one of the plurality of segments and via short range radio communication, the identification key; and collecting, at the vehicle, power from said at least one of the plurality of segments.

The above mentioned features of the method according to the first aspect or the system according to the second aspect, when applicable, apply to this third aspect as well. In order to avoid undue repetition, reference is made to the above.

According to a fourth aspect a vehicle configured to receive electric power from an electric road system that comprises a plurality of segments consecutively arranged along a single track line and a base station is provided. The vehicle comprises a transmitter configured to transmit identification data identifying the vehicle to the base station; a memory configured to store an identification key associated with the identification data; a short range radio communication transmitter configured to transmit the identification key to at least one of the plurality of segments; and an electrical power collector configured to collect electrical power from said at least one of the plurality of segments.

The above mentioned features of the methods according to the first or third aspects or the system according to the second aspect, when applicable, apply to this second aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

FIG. 1 is a top view of an electric road system.

FIG. 2 is a side view of a portion of the electric road system of FIG. 1.

FIG. 3 illustrates a base station 40 of the electrical road system.

FIG. 4 illustrates a segment of the first set of segments of the electrical road system.

DETAILED DESCRIPTION

Figure 5:
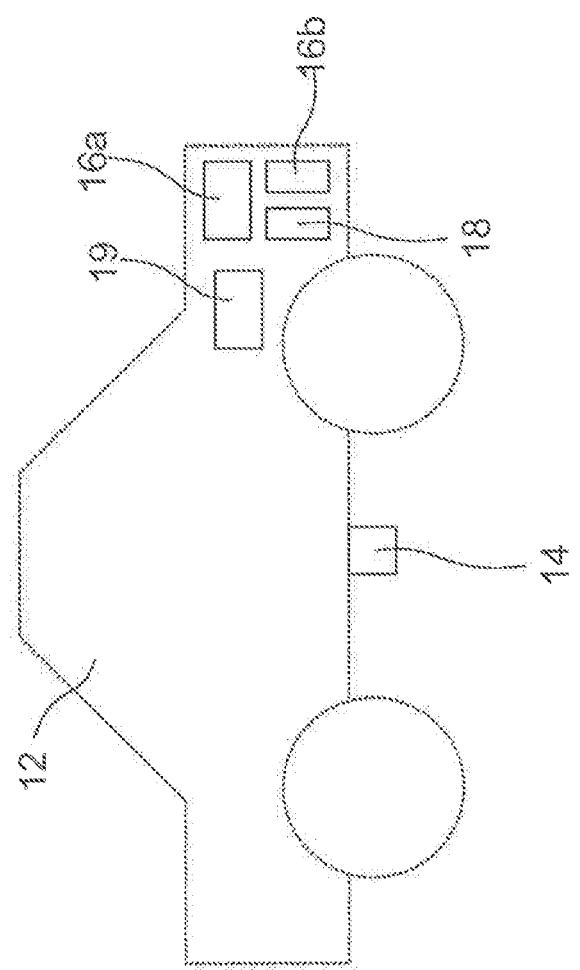
FIG. 5 illustrates a vehicle configured to interact within the electrical road system.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

An electric road system is illustrated in FIG. 1. The electric road system is mounted on a road surface 11. In FIG. 1 an electric vehicle 12, here in the form of an electric car, is travelling on the road in the direction indicated by 13. The electric road system comprises an electric road track 10 which extends along the intended travelling path of the road.

The general function of the electric road system is that it provides electrical power to electric vehicles travelling along the road. Thus, a battery of the electric vehicle can be charged while the electric vehicle is travelling on the road. Alternatively or in combination, the motors of the electric vehicles can be continuously powered by electricity. For powering and/or charging the electric vehicle 12 the electric road system is according to this embodiment arranged to provide power through the electrical road track 10 to which power collectors 14a, 14b, 14c of the car 12 can connect. Hence, according to this embodiment the electrical power is conducted from the electrical road track 10 to the electric vehicle 12.

The electrical road track 10 forms a single track line comprising a plurality of segments 30a, 30b. The segments 30a, 30b are separated along the track line by electrically isolating members 17. The segments 30a, 30b and the isolating members 17 may be arranged in a housing 20. Every second segment 30a is configured to be powered by a power station 15. The segments 30a configured to be powered by a power station 15 form a first set of segments 30a. The power station 15 may e.g. be located at the side of the road. The power station 15 is connected to the electrical road track 10 via conductors 15a, 15b. Upon being powered by a positive potential segment from the first set of segments 30a forms a positive pole. The other segments 30b form a second set of non-powered segments 30b. The non-powered segments 30b may be set to have the same potential as ground. Alternatively, a segment of the first set of segments 30a may be powered by a negative potential and thus form a negative pole. Upon powering one of the segments 30a of the first set of segments, a voltage difference is created between the powered segment 30a and the non-powered segments 30b. Hence, the single track line is segmented into a plurality of segments arranged to provide alternating potentials.

The power collectors 14a, 14b, 14c are arranged such that, at any moment during travelling, at least one of the power collectors 14a, 14b, 14c is in connection with a segment 30a of the first set of segments 30a and at least one other of the power collectors 14a, 14b, 14c is in connection with a segment 30b of the second set of segments 30b. Thus, continuous collection of power from the electrical road track 10 may be achieved upon the segments 30a of the first set of segments 30a are being powered.

The electrical road track 10 extends 200-500 m along the road. The segments 30a, 30b have a length, along an extension in the traveling direction 13 of the vehicle, being shorter than a length of the vehicle 12. According to a non-limiting example the length of the segments 30a, 30b are around 1 m long. The electrically isolating member 17 may be about 10-30 cm long. A plurality of electrical road tracks 10 can be arranged after each other. As can be seen in FIG. 1, two electric road tracks 10 are arranged after each other.

In FIG. 2 a portion of the electric road system of FIG. 1 is seen from the side. In addition to what is disclosed in connection with FIG. 1 the electric road system further comprises a base station 40. The base station 40 may be arranged in the power station 15. Alternatively, the base station 40 may be arranged as a standalone station separate from the power station. Yet alternatively, the base station 40 may be arranged in an aggregate together with other infrastructure related to a road, non-limiting examples of such other infrastructure are road signs, information displays, red lights and lamp-posts. The electric road system may further comprise one or more base stations 40. Each base station 40 may be associated with one or several power stations 15.

The base station 40 is in a segment communication connection with each segment 30a of the first set of segments 30a. The base station 40 may transmit data to the segments 30a over the segment communication connections. Each of the segments 30a may transmit data to the base station 40 over the respective segment communication connection. The segment communication connections may be wired connections. Alternatively or in combination, the segment communication connections may be wireless connections.

The base station 40 may also establish vehicle communication connections with vehicles. The base station 40 may transmit data to the vehicles over the vehicle communication connections. A vehicle may transmit data to the base station 40 over a vehicle communication connection. The vehicle communication connections are wireless connections.

In FIG. 3 the base station 40 is illustrated in more detail. The base station 40 comprises a receiver 41, an association module 42 and a transmitter 43. The base station 40 may further comprise a base station processor 45. The base station 40 may further comprise a computer memory 46. The base station 40 may further comprise a database 44.

The base station processor 45 may be arranged to process data of the base station receiver 41, the association module 42, the base station transmitter 43 and/or the database 44. Further, the base station processor 45 may be arranged to control flow of data between the receiver 41, the association module 42, the transmitter 43 and/or the database 44.

The receiver 41 is configured to receive data sent over a vehicle communication connection. Especially, the receiver 41 is configured to receive an identification message from a vehicle over a vehicle communication connection. The identification message comprises identification data identifying a vehicle. The identification data may be in the form of an identification key. Alternatively, the identification data may be data from which the identification key may be derived. Still alternatively, the identification key may be generated by the base station and associated with the identification data and transmitted to the vehicle. The vehicle communication connection is preferably a mid-range radio communication. Hence, the receiver 41 is configured to receive data sent over a mid-range radio communication. Preferably, the mid-range radio communication has a range being at least 100 meters. Non-limiting examples of mid-range radio communication protocols is one of the group of protocols comprising IEEE 802.11 p, ITSG5, 3G, 4G, and 5G.

The association module 42 is configured to associate the identification data and/or the identification key with an activation key. In case the identification data is data from which the identification key may be derived, the association module 42 may be configured to derive the identification key from the identification data. As a non-limiting example the identification key and the activation key are the same key. However, the identification key and the activation key may as well be different keys as long as they are associated with each other. The identification data and the activation key associated with each other are stored in the database 44. The association module 42 may be implemented as a hardware module, a software module being executed by a processor or a combination of both hardware and software.

The database 44 may be comprised in the base station 40. Alternatively, the database 44 may be partly comprised in the base station. In case the database 44 is partly comprised in the base station 40, the database 44 is a distributed database 44 distributed over a plurality of devices. The plurality of devices may comprise base stations and/or other suitable devices. The database 44 or the part of the database 44 may be stored in the computer memory 46.

The transmitter 43 may comprise first and second transmitter modules 43a, 43b. The first and second transmitter modules 43a, 43b may be the same transmitter module. The first and second transmitter modules 43a, 43b may be different transmitter modules. The first transmitter module 43a is configured to transmit the, from the identification data derived, identification key to the vehicle. Alternatively or in combination, the first transmitter module 43a may be configured to transmit a confirmation that the identification data is associated with the activation key. Preferably, the first transmitter module 43a is configured to transmit the identification key to the vehicle over the vehicle communication connection. Hence, preferably the transmitter module 43a is configured to be a mid-range radio communication transmitter module. The second transmitter module 43b is configured to transmit the activation key to the segments 30a in the first set of segments 30a. The second transmitter module 43b is configured to transmit the activation key to the segments 30a in the first set of segments 30a over the segment communication connections. As mentioned above the segment communication connections may be wired connections or wireless connections. In case of wireless connections, the segment communication connections are preferably mid-range radio communications. Hence, the second transmitter module 43b may be configured to transmit data over mid-range radio communications.

In FIG. 4 a segment 30a of the first set of segments 30a is illustrated in more detail. Each segment 30a in the first set of segments 30a comprises a receiver 31, a memory 32, a segment processor 33, a short range radio communication receiver 34, an authorization module 35 and an activation module 36.

The receiver 31 is configured to receive the activation key. Especially, the receiver 31 is configured to receive the activation key from the base station 40 over one of the segment communication connections. Hence, the receiver 31 is either configured to receive the activation key over a wired connection or over a wireless connection.

The memory 32 is configured to store the received activation key. A memory 32 of a single segment 30a of the first set of segments 30a may be configured to store more than one activation key.

The short range radio communication receiver 34 is configured to establish a short range radio communication connection with a vehicle. Preferably, the short range radio communication connection has a range being substantially the same as a length of the segment 30a. The short range radio communication may have a range of 0.15 to 5 meters. The short range radio communication is preferably one radio communication from the group of radio communications comprising: IrDA, Wireless USB, Bluetooth, Radio Frequency Identification (RFID), Z-Wave, and ZigBee. The short range radio communication receiver 34 is configured to receive an activation request. The activation request comprises the identification key.

The authorization module 35 is configured to confirm that the received identification key is associated with the received activation key. According to a non-limiting example the identification key and the activation key are the same key and hence the authorization module 35 is configured to compare identification key and the activation key to see if they are the same key. Other implementations known to a person skilled in the art on how to confirm that a key is associated with another key may as well be used. The identification key and the activation key may for example be complementary keys together forming a check sum. The authorization module 35 may be implemented as a hardware module, a software module being executed by a processor or a combination of both hardware and software.

The activation module 36 is configured to, upon positive confirmation by the authorization module 35, activate the segment for enabling power delivery to the vehicle. The activation module 36 may be implemented as a hardware module, a software module being executed by a processor or a combination of both hardware and software.

Each segment 30a in the first set of segments 30a may further comprise a segment-to-segment transceiver 37 and a deactivation module 38. The segment-to-segment transceiver 37 is configured to establish a segment-to-segment connection with another segment 30a in the first set of segments 30a. The segment-to-segment connection may be a wired connection or alternatively a wireless connection. The segment-to-segment transceiver 37 is configured to, upon positive confirmation by the authorization module 35, transmit a deactivation request from the segment 30a to a nearby segment 30a in the first set of segments 30a. The segment-to-segment transceiver 37 is further configured to receive deactivation requests from nearby segments 30a of the first set of segments 30a. The deactivation module 38 is configured to, upon receipt of the deactivation message, deactivate the segment 30a for disabling power delivery. The deactivation module 38 may be implemented as a hardware module, a software module being executed by a processor or a combination of both hardware and software.

Each segment 30a in the first set of segments 30a may further comprise a measuring module 39a and a transmitter 39b. The measuring module 39a is configured to measure power delivered by the segment 30a while activated for power delivery. The measuring module 39a may be implemented as a hardware module, a software module being executed by a processor or a combination of both hardware and software. The transmitter 39b is configured to, via a database communication connection, transmit the measured delivered power to the database 44. The database communication connection may be a wired connection. Alternatively the database communication connection may be a wireless connection. The database 44 is further configured to store the measured delivered power in association with the identification data.

The segment processor 33 may be arranged to process data of the receiver 31, the memory 32, the short range radio communication receiver 34, the authorization module 35, the activation module 36, the segment-to-segment transceiver 37, deactivation module 38, the measuring module 39a and/or the transmitter 39b. Further, the segment processor 33 may be arranged to control flow of data between the receiver 31, the memory 32, the short range radio communication receiver 34, the authorization module 35 and the activation module 36, the segment-to-segment transceiver 37, deactivation module 38, the measuring module 39a and/or the transmitter 39b. Of course may the receiver 31, the memory 32, the short range radio communication receiver 34, the authorization module 35 and the activation module 36, the segment-to-segment transceiver 37, deactivation module 38, the measuring module 39a and/or the transmitter 39b may send data to each other without going via the segment processor 33.

Data between two segments 30a, 30b may be sent to each other via the base station 40.

In FIG. 5 a vehicle 12 configured to interact within the electrical road system is shown. The vehicle 12 is configured to receive electric power from the electric road system. The vehicle 12 comprises a transmitter 16a, a receiver 16b, a short range radio communication transmitter 18 an electrical power collector 14, and a memory 19.

The transmitter 16a is configured to transmit an identification message. The identification message comprises the identification data identifying the vehicle. As discussed above, the identification data may be in the form of the identification key. Alternatively, the identification data may be data from which the identification key may be derived. The transmitter 16a is configured to transmit the identification message to a base station 40. The transmitter 16a is preferably configured to send data over the vehicle communication connection.

The receiver 16b may be configured to receive an identification key sent from the base station 40. Alternatively or in combination, the receiver 16b may be configured to receive a confirmation message from the base station 40. The confirmation message comprising information confirming that the identification data is associated with the activation key. The receiver 16b is preferably configured to receive data sent over the vehicle communication connection.

The memory 19 is configured to store the identification data and the identification key. As mentioned above for some embodiments the identification data is in the form of the identification key and for some embodiments the identification data and the identification keys are different data stored in the memory.

The short range radio communication transmitter 18 is configured to transmit an activation request, comprising the identification key, to at least one of the plurality of segments 30a of the first set of segments 30a. The short range radio communication transmitter 18 may be arranged on an underside of the vehicle. The short range radio communication transmitter 18 may be arranged on the electrical power collector 14. Preferably, the short range radio communication transmitter 18 is configured to transmit the activation request to a single one of the segments 30a of the first set of segments 30a at a time. The identification key is sent to the segment 30a for activation of the segment 30a to deliver electrical power to the vehicle.

The electrical power collector 14 is configured to collect electrical power from an activated segment. The electrical power collector 14 may be arranged as discussed in connection with FIG. 1; hence, being configured to conductively pick up electrical power from the electrical road track 10. If so the, electrical power collector 14 preferably comprises a plurality of electrical power collectors 14a, 14b, 14c, as illustrated in FIG. 1. The smallest distance between two of the plurality of electrical power collectors 14a, 14b, 14c is preferably shorter than the length of the segments 30a, 30b. Alternatively, the electrical power collector 14 may be configured to inductively pick up electrical power from the electrical road track 10 (for this embodiment the electrical road track 10 is set up to transfer electrical power via induction, see below).

Figure 6:
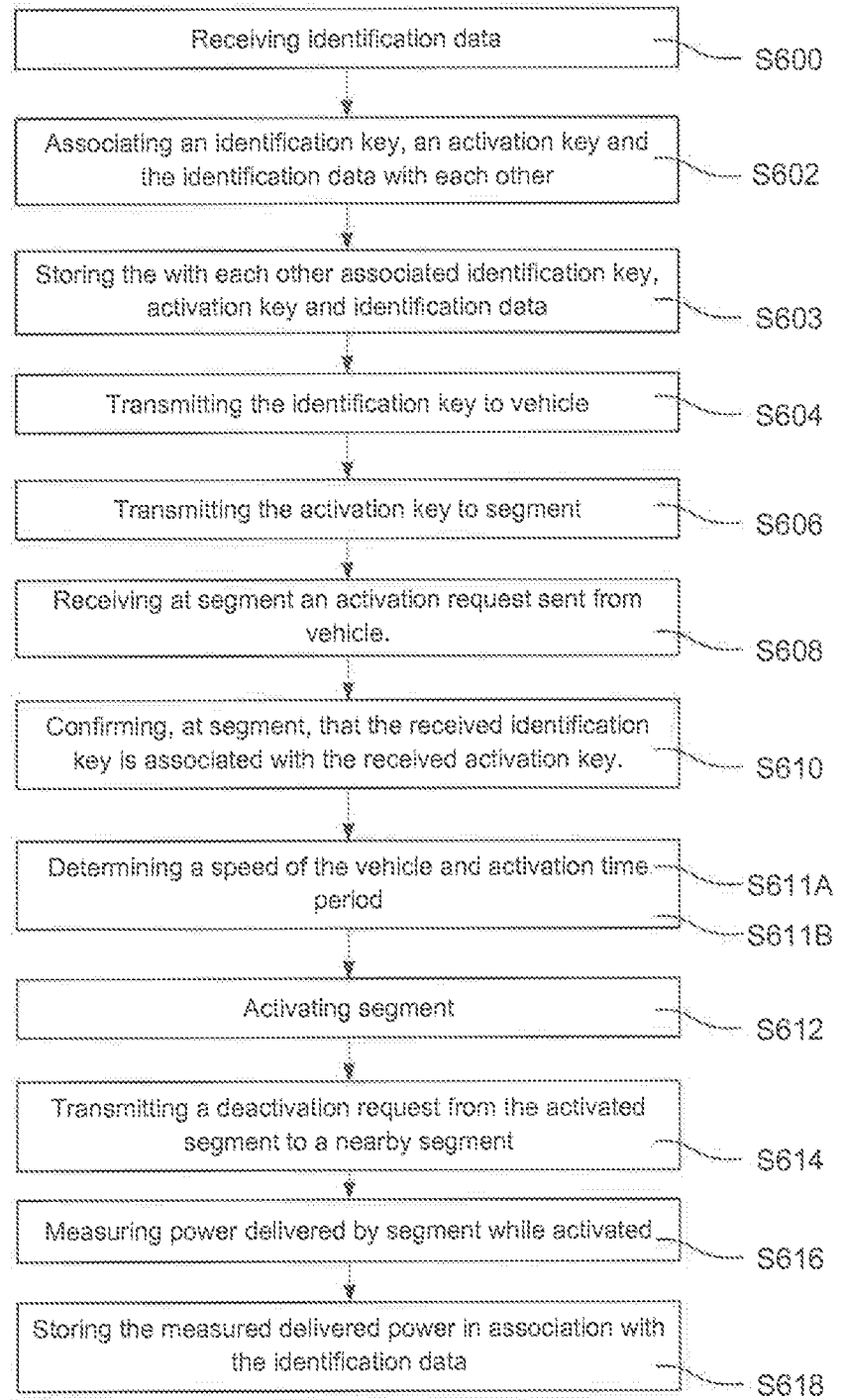
FIG. 6 is a block scheme of a method for activating a segment for enabling electrical power delivery to vehicles.

In connection with FIG. 6 a method for activating a segment 30a of the first set of segments 30a for enabling electrical power delivery to vehicles is illustrated. The method comprises the following acts. The act does not necessarily need to be performed in the order listed below. Receiving S600, at the base station 40, identification data transmitted from a vehicle, the identification data identifying the vehicle. Associating S602 an identification key, an activation key and the identification data with each other. Transmitting S606 the activation key from the base station to the segment 30a to be activated. Preferably, the activation key is transmitted S606 to all the segments 30a of the first set of segments 30a. Receiving S608, at the segment 30a to be activated and via short range radio communication, an activation request sent from the vehicle. The activation request comprises the identification key. Confirming S610, at the segment 30a to be activated, that the received identification key is associated with the received activation key. Upon positive confirmation, activating S612 the segment 30a to be activated for enabling power delivery to the vehicle. Preferably, only a single one of the set of segments 30a may be activated at a single point in time under the influence of the identification key. More preferably, only a single one of the set of segments 30a being located underneath the vehicle is activated at the single point in time. However, more than one segment 30a of the first set of segments 30a may be active at the same point in time.

The identification key may only be used ones for activating a specific segment 30a of the first set of segments 30a. In this way it is made harder for another vehicle to listen for identification keys and reuse them on the expense of the vehicle being the true receiver of the activation key. Only the vehicle that first activates a segment may receive power from the electric road system. However, it is still possible to activate downstream, in the traveling direction of the vehicle, segments 30 of the first set of segments 30a using the same identification key.

The method may further comprise transmitting S604 the identification key from the base station to the vehicle. Is so, the identification key may be derived, at the base station, from the identification data.

The method may further comprise transmitting a confirmation message to the vehicle that the identification data is associated with the activation key. If so, the identification data is preferably the identification data is in the form of the identification key.

The method may further comprise, upon positive confirmation, transmitting S614 a deactivation request from the activated segment 30a to a nearby active segment 30a of the first set of segments 30a. The nearby active segment 30a has been previously activated for enabling power delivery to the vehicle. Hence, two, or even more, adjacent segments 30a of the first set of segments 30a may be simultaneously active. Upon activation of a downstream, in the traveling direction 13 of the vehicle, segment 30a, the deactivation request is sent to an upstream, in the traveling direction 13 of the vehicle, segment 30a. However, only a single segment 30a of the first set of segments 30a is activated by the identification key at the same point in time.

The method may further comprise determining S611A a speed of the vehicle; and determining S611B an activation time period based on the determined speed of the vehicle and a length of the segment. Wherein the act of activating S612 is performed during a time period corresponding to the activation time period.

The method may further comprise, deactivating the activated segment upon detecting that power is collected from the segment and thereafter detecting that power no longer is collected from the segment. That power first is collected from the segment 30a and that thereafter power is no longer collected from the segment 30a is indicating that the vehicle has passed the segment 30a. Hence the segment shall be deactivated.

The method may further comprise storing S603 the with each other associated identification key, activation key and identification data in a database.

The method may further comprise measuring S616 power delivered by the segment while activated. Storing S618 the measured delivered power in the database in association with the identification data.

Figure 7:
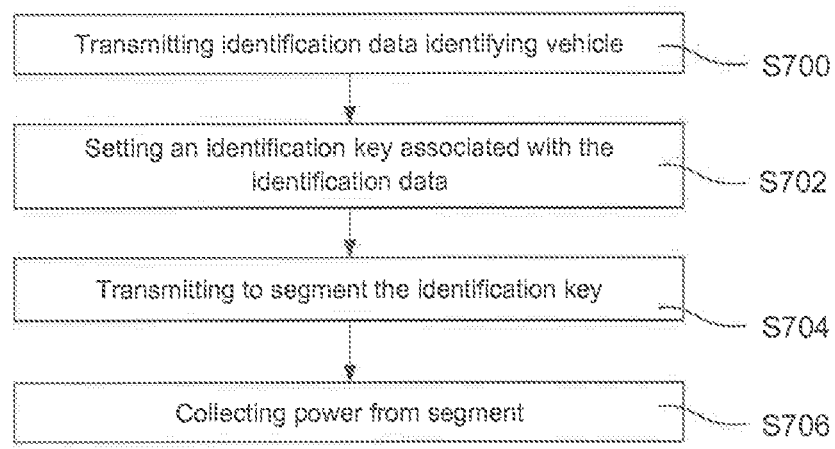
FIG. 7 is a block scheme of a method for electrically powering a vehicle by the electric road system.

In connection with FIG. 7 a method for electrically powering a vehicle by the electric road system is illustrated. The method comprises the following acts. The act does not necessarily need to be performed in the order listed below. Transmitting S700, from the vehicle 12 to the base station 40, identification data identifying the vehicle 12. Setting S702, at the vehicle 12, an identification key associated with the identification data. The act of setting may comprise receiving the identification key from the base station, wherein the identification key is derived at the base station from the identification data. The act of setting may comprise setting the identification data as the identification key, wherein the identification data forms the identification key. Transmitting S704, from the vehicle 12 to at least one of the plurality of segments 30a of the first set of segment 30a and via short range radio communication, the identification key. Collecting S706, at the vehicle, power from said at least one of the plurality of segments 30a.

The person skilled in the art realizes that the present invention by no means is limited to the preferred embodiments described above. On the contrary, many modifications and variations are possible within the scope of the appended claims.

For example, instead of or in combination with providing the electrical power to the electric vehicle conductively, the electrical road track 10 may be set up to transfer electrical power to the electrical vehicle via induction (not shown). For this set up of the electrical road system the segments 30a 30b are arranged as inductive powering segments.

Figure 8:
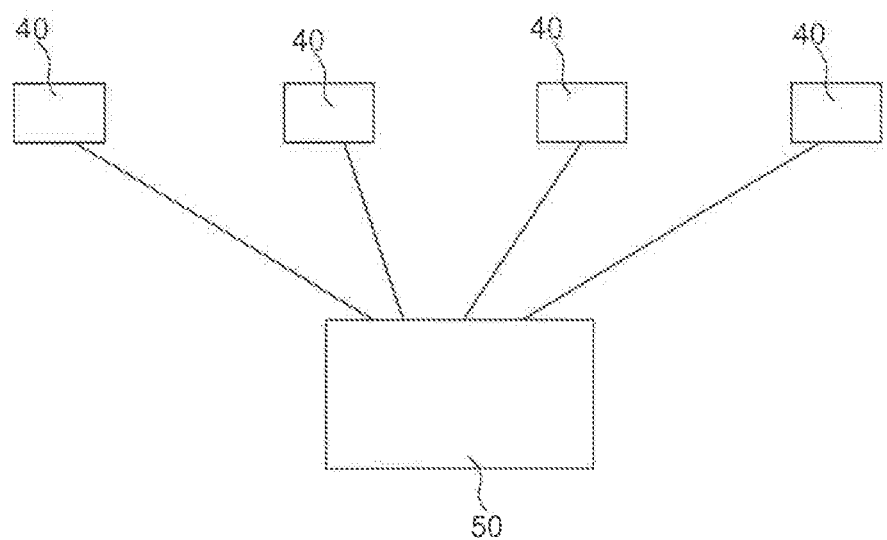
FIG. 8 is a block scheme over a system comprising control servers.

Moreover, as illustrated in FIG. 8 the electric road system may comprise a plurality of base stations 40. The plurality of base stations 40 are controlled by a control server 50. Each of the plurality of base stations 40 may be connected to the control server by wire of wirelessly. The database, or portions of the database, may be arranged in a control server 50. Instead of being comprised in a base station 40 the association module may be comprised in the control server 50.

Figure 9:
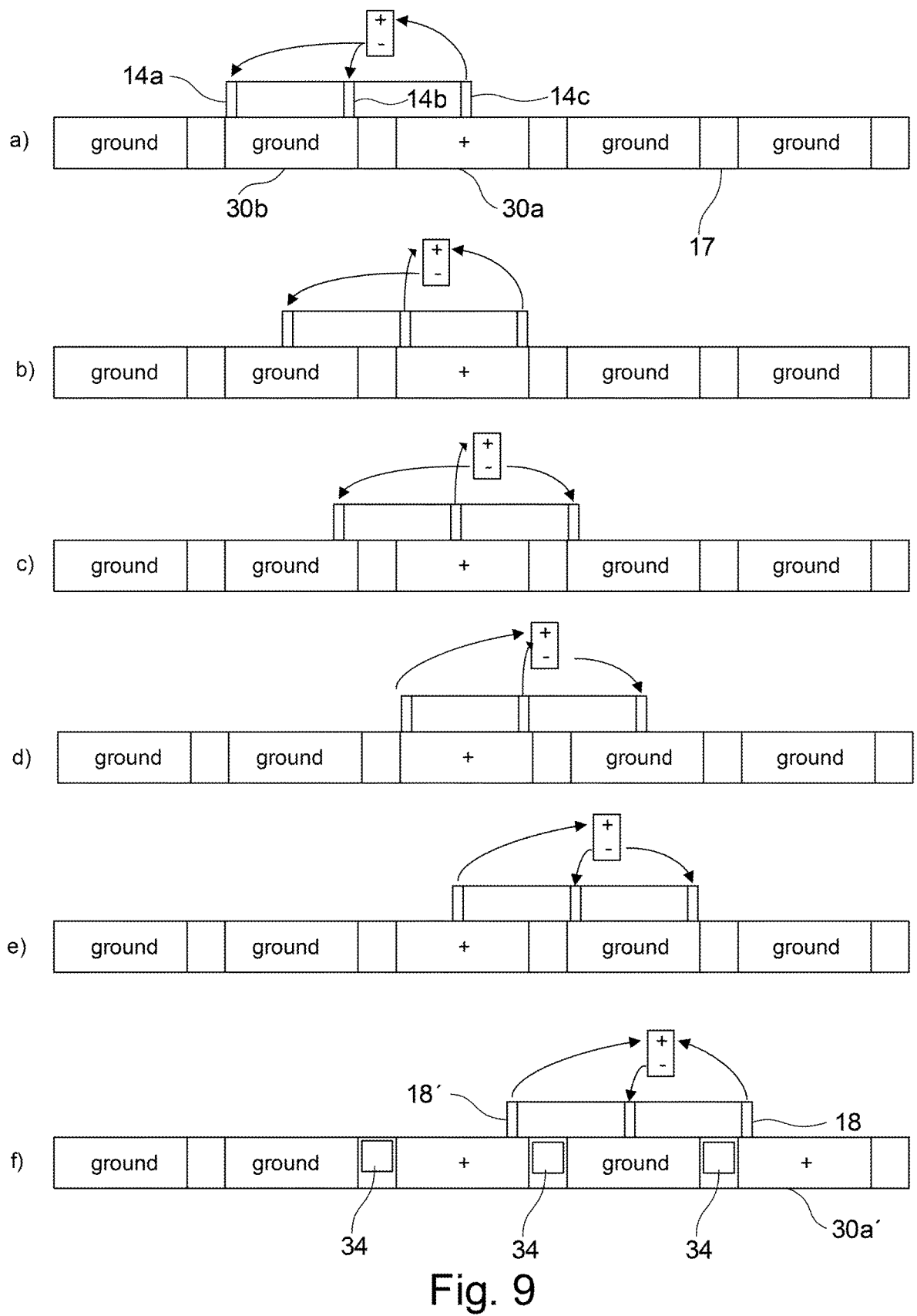
FIG. 9 is a side view of a portion of the electric road system showing consecutive positions for power delivery.

FIG. 9 shows an exemplifying embodiment of current switchover between three vehicle collectors 14a, 14b, 14c. The inner distance between the collectors is 70 cm and the width of the collector is 10 cm. The segments are each 100 cm long and an insulator 17 is arranged between the segments and is 15 cm long.

Each second segment 30b is always grounded. The intermediate segment 30a is also grounded, unless activated.

Each segment 30a of an electric road track 10 powered by a specific power station 15 is provided by the base station 40 with an activation key associated with an identification key of the vehicle. Thus, each segment 30a is activatable by receiving an activation request from the vehicle comprising the identification key. If no activation key is stored by the segment, it cannot be activated. If several activation keys are associated with several vehicle identification keys are stored, each vehicle can activate the segment comprising the corresponding activation key.

In FIG. 9a, a first segment 30a has been activated and delivers electric current to a battery in the vehicle, via first collector 14c, while current is returned via collectors 14a and 14b, both being connected to a grounded segment 30b. All other segments 30a and 30b are grounded.

In FIG. 9b, the mid-collector 14b has passed beyond the insulator 17. When the collector 14b passes up on the insulator, the current is broken via collector 14b, but taken over by the last collector 14a. Thus, no induction voltages are generated when the current via mid-connector 14b is ended, which means that substantially no sparks are generated. When the mid-collector 14b enters the conducting segment 30a, as shown in FIG. 9b, current is already running to the battery via first collector 14c, which again means that no sparks are generated. The current to the battery is gently divided via the two collectors 14c and 14b. The conduction of the current from the collectors to the battery is controlled by the charging system, so that the current passes in the correct direction, for example by means of switch transistors and/or diodes.

In FIG. 9c, the first collector 14c has passed the insulator 17 and entered the next segment 30b, which is grounded. When, the first collector 14c enters the insulator, the mid-collector 14b takes over the current and no sparks are formed. When the first collector 14c contacts the grounded segment after the insulator, it shares the conduction of current to ground with the last collector 14a in a gentle manner. Again, no sparks are formed.

In FIG. 9d, the last collector 14a has passed the insulator 17, whereby the ground current is taken over by first collector 14a. When the last collector 14a receives contact with the active segment 30a, it shares the current with the mid-collector 14b, which already has contact with the active segment.

In FIG. 9e, the mid-connector passes an insulator 17, whereby the last collector 14a takes over the current to the battery. When the mid-connector 14b passes to the grounded segment 30b, it shares the ground current with the first collector 14c.

In FIG. 9f, the first collector 14c passes an insulator 17. The first collector 14c is associated with the short range transmitter 18 of the vehicle and each insulator 17 is provided with a receiver 34, which receives the activation request and identification key from the vehicle. Upon positive confirmation, the new activatable segment 30a' is activated and switched from a grounded state to an active state. If the vehicle has a high speed, such activation may be in the position shown in FIG. 9e. The system is arranged so that the activation takes place before the last collector 14a has left the contact with the previous active segment 30a. Alternatively, at slow speed the active state of segment 30a' may be reached during the time the first collector 14c is passing the insulator 17, which means that the segment 30a' is already active when the first collector 14c contacts the new segment 30a' or shortly thereafter. In this case, a deactivation request is sent by the new segment 30a' as soon as it is activated and as soon as current is drawn from the new segment 30a' by the first collector 14c. The deactivation request is sent to the previous segment 30a, which is deactivated and connected to ground.

In this manner, a smooth delivery of current to the battery, or electric motor, is assured. The current is continuous, which means that maximum energy is transferred during a specific time period.

Each active segment is deactivated when receiving a deactivation request, as mentioned above, or when a specific time period has elapsed determined based on the speed of the vehicle, or when the segment senses that current has been drawn from the system, but has ceased. Other criteria may be used, such as the fact that fraud on the system is detected.

As soon as a segment has been activated, the segment may be arranged to send a deactivation request to all other segments in the electric road track, except the next segment in the electric road system. This means that no other segment can be activated, except the following segment.

There may be more than three collectors arranged.

A similar action is performed when the vehicle passes from one electric road track 10 to the next electric road track.

The short range transmitter 18 of the vehicle and the receiver 34 may be arranged to operate by different technologies, such as radio waves, including RFID technology, or Hall-sensors detecting magnetic fields, or inductive technology, or sound or vibration based technology, or conductive pick-up, or any combination of such technologies. If radio (or sound) waves are used, Doppler effect may be used for detecting that the transmitter has passed the receiver, due to the decrease in frequency. In an embodiment, one transmitter 18 is arranged close to the front of the vehicle and another transmitter 18' is arranged close to the end of the vehicle. A receiver 34 is arranged adjacent the insulator 17. The signals from transmitters 18 and 18' may be discriminated by the receiver. When the receiver determines that the signal strength from both transmitters 18 and 18' are equal, it is an indication that the vehicle is positioned directly above the receiver. The signals from one or both transmitters may be modulated to transmit the identification key to the receiver.

The transmitter 18 may be arranged as a rectangular coil, the symmetry axis being substantially vertical. The coil has a distance between the coil sides which are perpendicular to the driving direction, the distance being about 20 cm-70 cm, such as 40 cm. The receiver 34 comprises a coil being arranged with the symmetry axis horizontal. The system may operate at a frequency of about 140 kHz. The receiver 34 will first sense a signal from the leading side of the transmitter coil and then a signal from the trailing side of the transmitter coil, which signals have opposite phases. The phase shift and the amplitude of the field can be used for accurately determine when the transmitter coil passes the receiver coil. The used frequency of about 140 kHz is used because the disturbances in this frequency range are small. Frequency or amplitude modulation may be used for transmitting the desired information, the identification key. It is desired to transmit about 32 bits of data, for example three times for redundancy.

Furthermore, the vehicle communication connection may be a connection being based on light as the data carrying medium. For example, the vehicle communication connection may be embodied as modulations of an IR-light beam. Alternatively or in combination, the vehicle communication connection may be a connection being based on sound, especially ultra sound.

Moreover, the identification message sent from the vehicle to the base station, the transmission of the identification key from the base station to the vehicle, the transmission of the activation key from the base station to the segments of the first set of segments and/or the activation request sent from the vehicle to the segment to be activated may be encrypted.

Furthermore, the identification message may additionally comprise other data pertaining to the vehicle, such as speed of the vehicle, power outtake need for the vehicle, the type of vehicle, the position of the vehicle, or other data indicating status of the vehicle. This other data may be transmitted from the base station to the segments of the first set of segments. This provide for an efficient way of providing the segments of the first set of segments with additional data pertaining to the approaching vehicle without the vehicle being required to send this additional data directly to the segments of the first set of segments. Hence, the amount of data being transmitted from the vehicle directly to the segments of the first set of segments may be minimized. The data pertaining to the vehicle may be transferred from a base station 40 to the control server 50.

Moreover, the segments 30a may be arranged to collect additional data, such as voltage, temperature, sound data, shake sensor data, acceleration, humidity and controller reports of errors. The segments 30a may transmit this additional data to the base station 40 via the segment communication connection. Further, this additional data may be transferred from a base station 40 to the control server 50.

Additionally, variations to the disclosed embodiments can be understood and effected by the skilled person in practicing the claimed invention, from a study of the drawings, the disclosure, and the appended claims.

The invention claimed is:

1. A method for activating/deactivating segments of a track line of an electric road system for enabling electrical power delivery to vehicles, the method comprising:
   receiving, at a base station, identification data transmitted from a vehicle, the identification data identifying the vehicle;
   associating an activation key with the identification data;
   transmitting the activation key from the base station to a segment of a plurality of segments consecutively arranged along a single track line to provide alternating potentials, wherein every second of the plurality of segments, including the segment, belong to a first set of segments to be powered, and wherein other segments form a second set of non-powered segments;
   receiving, at the segment and via short range radio communication, an activation request sent from the vehicle, wherein the activation request comprises an identification key associated with the identification data;
   confirming, at the segment, that the received identification key is associated with the received activation key;
   upon positive confirmation:
      activating the segment for enabling power delivery to the vehicle,
      powering the segment and creating a voltage difference between the powered segment and the non-powered segments to provide alternating potentials, and
      transmitting a deactivation request from the segment to a previously activated segment of the first set of segments.

2. The method according to claim 1, further comprising:
   measuring power delivered by the powering segment while activated; and
   storing the measured delivered power in a database in association with the identification data.

3. The method according to claim 1, wherein one or more of the acts of receiving identification data, transmitting the identification key, and transmitting the activation key is performed via a mid-range radio communication, wherein the mid-range radio communication is a radio communication having a range of at least 100 meters, preferably a range of at least 500 meters.

4. The method according to claim 1, further comprising:
determining a speed of the vehicle;
determining an activation time period based on the determined speed of the vehicle and a length of the segment; wherein the segment is set to be active during a time period corresponding to the activation time period.

5. An electric road system for enabling electrical powering of vehicles, the electric road system comprising:
a plurality of segments consecutively arranged along a single track line to provide alternating potentials, wherein every second of the plurality of segments belong to a first set of segments to be powered, wherein other segments form a second set of non-powered segments; and
a base station, comprising:
a receiver configured to receive an identification message, the identification message comprising identification data identifying a vehicle,
an association module configured to associate the identification data with an activation key; and
a transmitter module configured to transmit the activation key to the segments in the first set of segments;
wherein each segment in the first set of segments comprises:
a receiver configured to receive the activation key,
a memory configured to store the received activation key,
a short range radio communication receiver configured to receive an activation request from the vehicle, the activation request comprising an identification key associated with the identification data;
an authorization module configured to confirm that the received identification key is associated with the received activation key,
an activation module configured to, upon positive confirmation, activate the segment for enabling power delivery to the vehicle,
a transceiver configured to, upon positive confirmation, transmit a deactivation request from the segment to a nearby segment in the first set of segments; and
a deactivation module configured to, upon receipt of a deactivation message, deactivate the segment for disabling power delivery to the vehicle.

6. The electric road system according to claim 5, wherein each segment in the first set of segments further comprises:
a measuring module configured to measure power delivered by the segment while the segment is active; and
a transmitter configured to transmit the measured delivered power to a database for storing the measured delivered power therein in association with the identification data.

7. The electric road system according to claim 5, further comprising a power station configured to power an activated segment of the first set of segments such that a voltage difference between the powered segment and a non-powered segment created.

8. The electric road system according to claim 5, wherein at least two power collectors of the vehicle are arranged such that, at any moment during travelling, a first power collector of the at least two power collectors is in connection with the powered segment and a second power collector of the at least two power collectors is in connection with the non-powered segment to enable continuous collection of power from the single track line.

9. The electric road system according to claim 5, wherein the powered segment and the non-powered segment are separated along the single track line by an electrically isolating member.

* * * * *